United States Patent
Nakai et al.

(10) Patent No.: US 7,909,068 B2
(45) Date of Patent: Mar. 22, 2011

(54) METHOD FOR PRODUCING POSITIVE ELECTRODE PLATE FOR ALKALINE STORAGE BATTERY

(75) Inventors: Haruya Nakai, Osaka (JP); Takashi Ohkawa, Osaka (JP); Hiroyuki Kannari, Osaka (JP); Hiroyuki Usui, Osaka (JP); Tomitake Omori, Osaka (JP); Hideki Kasahara, Osaka (JP); Gota Asano, Osaka (JP); Yoshiyuki Muraoka, Osaka (JP); Nobuyuki Kawaguchi, Osaka (JP); Takashi Ebihara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/482,138

(22) Filed: Jun. 10, 2009

(65) Prior Publication Data

US 2009/0242072 A1    Oct. 1, 2009

Related U.S. Application Data

(62) Division of application No. 11/210,673, filed on Aug. 25, 2005, now Pat. No. 7,846,574.

(30) Foreign Application Priority Data

Aug. 27, 2004  (JP) .................. 2004-247973
Nov. 17, 2004  (JP) .................. 2004-332994

(51) Int. Cl.
*H01M 4/02* (2006.01)
*H01M 4/24* (2006.01)
*H01M 10/24* (2006.01)
*H01M 10/28* (2006.01)

(52) U.S. Cl. ....... 141/1.1; 29/623.3; 29/623.5; 429/128; 429/215; 429/217; 427/126.6

(58) Field of Classification Search .................. None
See application file for complete search history.

(56) References Cited

U.S. PATENT DOCUMENTS

| | | | |
|---|---|---|---|
| 4,608,325 A * | 8/1986 | Ismail | 429/217 |
| 4,887,349 A | 12/1989 | Kambayashi et al. | |
| 5,637,416 A | 6/1997 | Yoshii et al. | |
| 5,721,073 A | 2/1998 | Matumura et al. | |
| 5,759,718 A * | 6/1998 | Yao et al. | 429/223 |
| 5,968,684 A * | 10/1999 | Hayashi et al. | 429/223 |
| 6,309,775 B1 | 10/2001 | Mank | |
| 6,344,088 B1 | 2/2002 | Kamikihara et al. | |
| 6,656,232 B1 | 12/2003 | Usui et al. | |
| 6,682,857 B2 | 1/2004 | Takezawa | |
| 6,878,173 B2 | 4/2005 | Miyahisa et al. | |
| 2001/0042288 A1 * | 11/2001 | Omae et al. | 29/2 |
| 2002/0106565 A1 * | 8/2002 | Hayashi et al. | 429/223 |
| 2003/0017394 A1 * | 1/2003 | Nakai et al. | 429/217 |

FOREIGN PATENT DOCUMENTS

| | | |
|---|---|---|
| JP | 01163965 | 6/1989 |
| JP | 09027342 | 1/1997 |

(Continued)

*Primary Examiner* — Ula C. Ruddock
*Assistant Examiner* — Alix Echelmeyer
(74) *Attorney, Agent, or Firm* — Dickinson Wright PLLC

(57) ABSTRACT

An alkaline storage battery including a strip-shaped porous metal substrate and a material mixture filled into the substrate. The substrate has an unfilled portion where the material mixture is not filled along at least one of two longitudinal sides of the substrate. The substrate has a weight per unit area of 150 to 350 g/m². The material mixture contains an active material and an elastic polymer.

10 Claims, 5 Drawing Sheets

FOREIGN PATENT DOCUMENTS

| | | |
|---|---|---|
| JP | 09106814 | 4/1997 |
| JP | 09106815 | 4/1997 |
| JP | 11273671 | 10/1999 |
| JP | 2000077067 | 3/2000 |
| JP | 2000113881 | 4/2000 |
| JP | 2000233151 | 8/2000 |
| JP | 2002075345 | 3/2002 |
| JP | 2002134106 | 5/2002 |
| JP | 2003017065 | 1/2003 |
| JP | 2003068292 | 3/2003 |

\* cited by examiner

F I G. 1
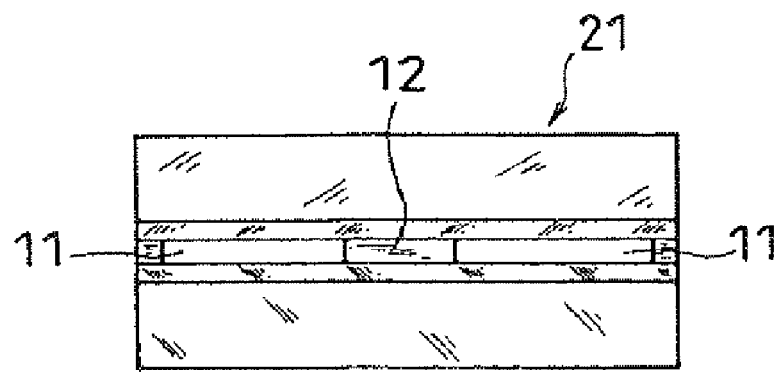
F I G. 2
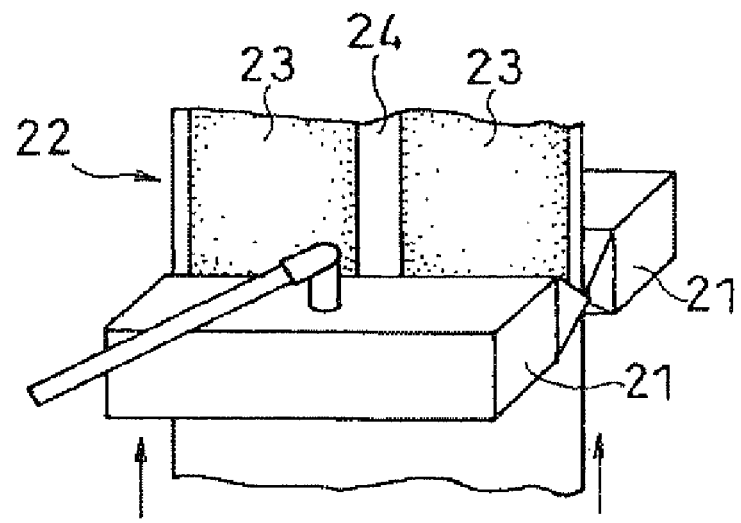

METHOD FOR PRODUCING POSITIVE ELECTRODE PLATE FOR ALKALINE STORAGE BATTERY

This is a divisional application of application Ser. No. 11/210,673 filed Aug. 25, 2005, now U.S. Pat. No. 7,846,574, which is based on and claims priority of Japanese Application No. 2004-247973, filed Aug. 27, 2004, Japanese Application No. 2004-332994, filed Nov. 17, 2004.

FIELD OF THE INVENTION

The present invention relates to a positive electrode plate for an alkaline storage battery and a method for producing the same. More particularly, the invention relates to a positive electrode plate using a porous metal substrate having three-dimensionally connected pores.

BACKGROUND OF THE INVENTION

Alkaline storage batteries, which can be repeatedly charged and discharged, have been widely used as power sources for portable equipment. In recent years, in particular, nickel-metal hydride storage batteries, which have a high energy density and are relatively environmentally friendly, are dominant in the marketplace, and the demand therefor is rapidly growing in the fields that require high power output such as power tools and hybrid electric vehicles (HEV).

In positive electrode plates for alkaline storage batteries, porous metal substrates are preferably used as the core material because they are easy to be filled with a material mixture paste composed of an active material, and the rolling step after drying of the material mixture is easily performed. Further, improvement in capacity density can be expected. Particularly, foamed nickel substrates, which are produced by electroplating or electroless plating a urethane sheet with nickel, followed by baking to remove carbon components, are widely used as porous metal substrates.

High power output alkaline storage batteries have the following configuration to improve current collecting efficiency. On a strip-shaped electrode is formed an unfilled portion, where a material mixture composed of an active material is not filled, along one side of two longitudinal sides thereof. A positive electrode and a negative electrode each having this structure are spirally wound with a separator interposed therebetween to form a cylindrical electrode group, whereby the unfilled portion of the positive electrode is positioned at one end of the electrode group and the unfilled portion of the negative electrode is positioned at the other end of the same. By welding current collector plates thereto, it is possible to efficiently collect current from the electrodes.

Various attempts have been made to develop a method for producing a positive electrode plate for an alkaline storage battery, some of which are listed below.

(i) A method in which a porous metal substrate in a hoop shape is continuously fed into a vessel holding a material mixture paste composed of an active material so as to fill the paste into the substrate, which is then allowed to pass through a roll smoother to smoothen the surface of the substrate filled with the paste, followed by drying and rolling (see Japanese Laid-Open Patent Publication No. Hei 1-163965).

(ii) A method in which a material mixture paste is sprayed to a porous metal substrate with a high pressure from a nozzle to fill the paste into the substrate, which is then allowed to pass through a slit to remove excess paste therefrom, followed by drying and rolling.

(iii) A method in which a material mixture paste is filled from one surface of a porous metal substrate such that most part of the other surface is not filled with the paste, followed by drying and rolling. In this method, preferably, the material mixture paste is filled from one surface of the porous metal substrate such that the other surface is not filled with the paste at all (see Japanese Laid-Open Patent Publications Nos. Hei 9-106814 and Hei 9-27342).

(iv) A method in which a material mixture paste is sprayed to both surfaces of a porous metal substrate in a hoop shape from nozzles each positioned close to each surface of the substrate so as to fill the paste into the substrate while the substrate is moved in the longitudinal direction thereof. The distance between the nozzle and the substrate is set to 1.0 mm or less (see Japanese Laid-Open Patent Publication No. Hei 9-106815).

In the proposals of Japanese Laid-Open Patent Publications Nos. Hei 1-163965 and Hei 9-106814, the entire porous metal substrate is filled with the material mixture paste. However, positive electrode plates for alkaline storage batteries need to have an unfilled portion where a material mixture paste is not filled (i.e. exposed portion of a substrate) to which a current collector plate is welded (see Japanese Laid-Open Patent Publication No. 2000-113881). Accordingly, it is necessary to remove the material mixture having been filled in the substrate.

In view of this, Japanese Laid-Open Patent Publication No. 2002-75345 proposes to press a porous metal substrate filled with a material mixture such that protrusions (ribs) are formed, to which ultrasonic vibration is applied to remove the material mixture from the protrusions, after which the protrusions are utilized as unfilled portions to which a current collector plate is welded. This method, however, is accompanied by problems such as more steps, more loss of active material and high costs.

Because the amount of a material mixture paste filled in a substrate depends on the porosity of the substrate, it is difficult to fill a constant amount of material mixture paste into a substrate using the proposals of Japanese Laid-Open Patent Publications Nos. Hei 1-163965 and Hei 9-106814, and a variation in the paste filling rate is caused. The paste filling rate is defined by the ratio of the volume of a paste filled into a substrate to the volume of pores of the substrate.

Further, according to the proposals of Japanese Laid-Open Patent Publications Nos. Hei 1-163965 and Hei 9-106814, because bubbles are generated when a paste is filled into a substrate, only a paste filling rate of about 90 to about 95% can be achieved at most and the porous metal is exposed on the substrate surface. As a result, metal burrs are easily formed when electrode plate is cut into a predetermined size. Also, a short circuit is likely to occur due to the exposed metal when the positive electrode and a negative electrode are spirally wound with a separator interposed therebetween to form an electrode group. In order to prevent the above problems, a thick separator should be used, which makes it difficult to achieve a high capacity battery.

According to the proposal of Japanese Laid-Open Patent Publication No. Hei 9-27342, it is possible to spray a constant amount of paste from a die, which significantly reduces the variation in paste filling rate in the longitudinal direction of the substrate. However, this is not practical because the paste filling rate is very low and therefore the electrode plates obtained after rolling have different thicknesses. As for battery performance, when metal is exposed on the entire one surface of an electrode plate, a part of metal is embedded in an adjoining separator, which shortens the distance between the positive and negative electrodes, resulting in a large amount of self discharge.

The proposal of Japanese Laid-Open Patent Publication No. Hei 9-106815 also requires the removal of the material mixture having been filled in the substrate in order to create an unfilled portion (i.e. exposed portion of a substrate), which results in high costs.

From the viewpoint of increasing productivity, it is proposed to form, in a substrate, an unfilled portion where a material mixture is not filled by applying a material mixture paste on the substrate in a strip pattern. Devices for performing such stripe application are also proposed. For example, Japanese Laid-Open Patent Publication No. 2000-233151 proposes a device equipped with a means to adjust a slit gap. Such stripe application is effective when a material mixture paste is applied on a substrate made of a metal foil. However, it is not always effective because, when a material mixture paste is filled into a porous metal substrate in a stripe pattern, the material mixture paste may easily enter the unfilled portion.

As mentioned earlier, porous metal substrates such as foamed nickel substrates are widely used for positive electrode plates for alkaline storage batteries. However, conventional porous metal substrates are costly to produce, and it is difficult to further improve the current level of the filling rate.

Although porous metal substrates having a lower weight per unit area than conventional ones can be produced at a relatively low cost, the use of a substrate having a low weight per unit area reduces current collecting efficiency, leading to a decrease in high rate discharge performance and active material utilization rate.

Further, when a material mixture paste is filled into a porous metal substrate having a low weight per unit area in a stripe pattern, the entering of the material mixture paste into the unfilled portion is facilitated, causing a great loss of active material. When a current collector is welded to the unfilled portion where the material mixture has entered, a weld defect may be caused by sparks or the like, reducing the strength of the welded portion. The material mixture having entered the unfilled portion can be removed completely, but it is inefficient.

SUMMARY OF THE INVENTION

In view of the above, an object of the present invention is to provide a positive electrode plate comprising a substrate with a low weight per unit area and having excellent current collecting efficiency. Another object of the present invention is to provide an efficient method for producing a positive electrode plate by efficiently filling a material mixture paste into a porous metal substrate having a low weight per unit area. Still another object of the present invention is to prevent the loss of a material mixture and to avoid a weld defect between an unfilled portion and a current collector plate by achieving a precise definition of the interface between a material mixture-filled portion and the unfilled portion.

The present invention relates to a positive electrode plate for an alkaline storage battery comprising a strip-shaped porous metal substrate and a material mixture filled into the substrate, wherein the substrate has an unfilled portion where the material mixture is not filled along at least one of two longitudinal sides of the substrate, the substrate has a weight per unit area of 150 to 350 g/m$^2$, and the material mixture comprises an active material and an elastic polymer (a polymer having rubber property).

The present invention further relates to a method for producing a positive electrode plate for an alkaline storage battery comprising the steps of: controlling the thickness of an original material made of a porous metal having a weight per unit area of 150 to 350 g/m$^2$ to form a porous metal substrate; filling a material mixture paste containing an active material and an elastic polymer into the substrate in a stripe pattern to form at least one material mixture paste-filled portion and at least one unfilled portion; drying the substrate filled with the material mixture paste; rolling the dried substrate filled with the material mixture paste to form an electrode plate; and cutting the electrode plate into a predetermined size.

The "material mixture paste" used herein is a mixture of a material mixture and a liquid component (dispersing medium for the material mixture). The liquid component is removed by the drying step.

The method of the present invention include a method for producing a positive electrode plate for an alkaline storage battery comprising the steps of: controlling the thickness of an original material made of a porous metal having a weight per unit area of 150 to 350 g/m$^2$ to form a porous metal substrate; filling a material mixture paste containing an active material and an elastic polymer into the substrate in a stripe pattern to form at least one unfilled portion where the material mixture paste is not filled between material mixture paste-filled portions and; drying the substrate filled with the material mixture paste; rolling the dried substrate filled with the material mixture paste to form an electrode plate; and cutting the electrode plate along the at least one unfilled portion between the material mixture paste-filled portions into a predetermined size.

Because the porous metal substrate has a low density with a weight per unit area of 150 to 350 g/m$^2$, a high capacity positive electrode can be produced at a lower cost than using conventional technique. Further, because the material mixture contains an active material and an elastic polymer, even when the substrate has a low weight per unit area, it is possible to produce a flexible positive electrode whose current collection network is unlikely to be broken. Accordingly, a battery having excellent high rate discharge performance and excellent active material utilization rate can be provided. Moreover, because the material mixture contains an active material and an elastic polymer, even when the substrate has a low weight per unit area, a positive electrode less likely to produce metal burrs and cracks can be obtained.

Note that the "filled portion" used herein means a part of the porous metal substrate filled with the material mixture or material mixture paste, and that the "unfilled portion" means a part of the porous metal substrate where the material mixture or material mixture paste is not filled.

The "porous metal substrate" means a substrate made of a metal having three-dimensionally connected pores. A preferred example of the porous metal substrate is a foamed nickel substrate. The foamed nickel substrate is produced by, for example, electroplating or electroless plating a urethane sheet with nickel and then baking the sheet to remove a carbon component therefrom. Other than the foamed nickel substrate, a sintered substrate or a three-dimensionally structured metal sheet can be used. The sintered substrate is produced by sintering the powders of carbonyl nickel or the like.

The material mixture contains an active material and an elastic polymer as indispensable components. The active material contributes to an electrochemical reaction, and the elastic polymer functions as a binder.

The elastic polymer has a glass transition temperature (Tg) of less than 25° C. (room temperature), and it is a polymer having elasticity at room temperature. A preferred example thereof is a copolymer of tetrafluoroethylene and propylene. Particularly preferred is a copolymer composed of a tetrafluoroethylene (TFE) unit and a propylene (PP) unit at a molar ratio of 30:70 to 70:30. Alternatively, a copolymer composed of a tetrafluoroethylene unit and a propylene unit at a molar ratio similar to the above and further a vinylidene fluoride unit in an amount of not greater than 5 mol % can be used.

Preferably, the material mixture further contains at least one selected from the group consisting of xanthan gum, guar gum, carrageenan and diutan gum. More preferably, the material mixture further contains xanthan gum and carboxymethyl cellulose as a thickener.

As the active material, particles of a nickel oxide such as nickel hydroxide or nickel oxyhydroxide can be used. The particles preferably have a mean particle size of 5 to 15, and a BET specific surface area of 5 to 15 $m^2/g$. From the viewpoint of increasing high rate discharge performance and active material utilization rate, cobalt oxyhydroxide having an oxidation number of 2.9 to 3.4 is preferably carried on the surface of the nickel oxide particles as a conductive material.

From the viewpoint of enhancing the effect of preventing a short-circuit, the surface of the porous metal substrate is preferably covered with a layer (hereinafter referred to as surface material mixture layer) composed of the material mixture having a thickness of 10 to 100 μm.

The porous metal that forms the substrate is preferably iron plated with nickel or nickel.

From the viewpoint of obtaining a desired elasticity, the elastic polymer preferably has a glass transition temperature of −10 to +20° C. The amount of the elastic polymer contained in the material mixture is preferably 0.2 to 5 parts by weight per 100 parts by weight of the active material.

The glass transition temperature can be determined by, for example, using a calorimeter, as a temperature at which a change in endothermic rate or thermal expansion coefficient is the greatest when an elastic polymer is heated. As the calorimeter, a differential scanning calorimeter (DSC), a thermomechanical analyzer (TMA), etc can be used.

In the production method of the present invention, it is preferred that a compressed gas is sprayed onto a portion of the substrate which will serve as the unfilled portion while the material mixture paste is filled into the porous metal substrate.

By spraying a compressed gas onto the unfilled portion, the material mixture that would otherwise spread from the filled portion to the unfilled portion is continuously pushed back to the filled portion. Thereby, the spread of the material mixture paste into the unfilled portion can be prevented, which enables smooth welding between the unfilled portion and a current collector plate.

For example, while the material mixture paste is continuously filled into the porous metal substrate, a compressed gas is sprayed onto the unfilled portions positioned at the external ends of the filled portion. Alternatively, while the material mixture paste is continuously filled into the porous metal substrate in a stripe pattern, a compressed gas is sprayed onto the unfilled portions each positioned at the external end of each outermost filled portion and the unfilled portion between filled portions.

The step of spraying a compressed gas can be performed efficiently using a device including, for example, a means to release the hooped porous metal substrate, a die nozzle having a silt-shaped outlet for spraying the material mixture paste, a means to spray a compressed gas, a means to dry the substrate filled with the material mixture paste, and a means to wind up the dried substrate filled with the material mixture paste, wherein the die nozzle and the means to spray a compressed gas are disposed adjacent to each other.

The slit-shaped outlet is an opening in a form of an interstice. Preferably, the space of the interstice is 0.5 to 1.5 mm.

An example of the means to release the hooped porous metal substrate is the uncoiler 72 of FIG. 9. An example of the means to spray a compressed gas is the compressed gas spraying outlet of FIG. 9. An example of the means to dry the substrate filled with the material mixture paste is the drying oven of FIG. 9. An example of the means to wind up the dried substrate filled with the material mixture paste is the coiler 79 of FIG. 9.

In the step of filling the material mixture paste into the porous metal substrate, for example, the substrate is allowed to pass in the longitudinal direction of the substrate through a gap having a predetermined width between a plurality of die nozzles which are facing towards each other, during which the material mixture paste is sprayed from the slit-shaped outlets of the plurality of die nozzles to the substrate. The material mixture paste is sprayed onto the substrate in a stripe pattern. Thereby, the step of filling the material mixture paste into the substrate can be performed efficiently.

When the material mixture paste is filled into the porous metal substrate, it is preferred to control the distance between the die nozzle and the substrate or the flow rate of the material mixture paste sprayed from the die nozzle based on the amount of the material mixture paste filled into the substrate measured by an X-ray weight analyzer or β-ray weight analyzer and/or the width of the filled portion of the substrate measured by an image recognition device.

In the plurality of die nozzles facing towards each other, the slit-shaped outlet is preferably divided into a plurality of sections by at least one partition. By using such die nozzles, a plurality of filled portions in a stripe pattern can be formed when the material mixture paste is filled in the substrate.

As the plurality of die nozzles facing towards each other, there can be used a combination of a plurality of units, each unit having a slit-shaped outlet for spraying the material mixture paste. In this case, the plurality of units are arranged such that their slit-shaped outlets are aligned in a line. In this case also, a plurality of filled portions in a stripe pattern can be formed when the material mixture paste is filled in the substrate.

From the viewpoint of stabilizing the paste filling rate in the porous metal substrate, the plurality of die nozzles are preferably arranged such that the plurality of die nozzles face towards each other with a displacement of the positions of their slit-shaped outlets in an amount of 1 to 5 mm in a direction in which the substrate passes.

The porous metal substrate is obtained by, for example, by controlling the thickness of an original material made of a porous metal by pressing or the like. The porous metal substrate preferably has a thickness of 200 to 150% μm and a porosity of 88 to 97%. The "porosity" used herein means a volume percentage of the pores (three dimensionally connected pores) in the substrate.

The volume of the material mixture paste filled in the porous metal substrate is preferably 95 to 150% of the volume of the pores in the substrate. In other words, the paste filling rate, which is defined by a ratio of the volume of the filled paste to the volume of pores in the substrate, is preferably 95 to 150%.

When the material mixture paste is applied onto a porous metal substrate having a low weight per unit area, the material mixture may unintentionally spread to the unfilled portion by dripping of the material mixture paste. In order to prevent the dripping of the material mixture paste, the material mixture paste preferably has a viscosity at 20 rpm of 3 to 15 Pa·s and a viscosity ratio (viscosity at 2 rpm/viscosity at 20 rpm) of not less than 2. The viscosity of the material mixture paste is measured at 25° C. (room temperature). Further, the material mixture paste preferably has a viscosity at 2 rpm of 10 to 70 Pa·s.

The viscosity at 20 rpm and the viscosity at 2 rpm are measured at a rotation speed of 20 rpm and 2 rpm, respectively, at 25° C. by a B type viscometer.

The material mixture can further contain, in addition to the active material and the elastic polymer, the previously mentioned thickener such as xanthan gum, guar gum, carrageenan, diutan gum or carboxymethyl cellulose. The material mixture can further contain a conductive material such as cobalt oxyhydroxide.

In the material mixture paste, the liquid component (dispersing medium for the material mixture) is preferably water.

Since a material mixture containing an active material and an elastic polymer is used with a porous metal substrate having a low weight per unit area in the present invention, it is possible to produce a flexible positive electrode plate with a high capacity whose current collection network is unlikely to be broken and which is less likely to produce metal burrs and cracks at a lower cost than conventional techniques.

In other words, with the use of the positive electrode of the present invention, it is possible to produce an alkaline storage battery capable of providing a large discharge capacity even when discharged at a large current and having high active material utilization rate and excellent charge/discharge cycle characteristics at a lower cost than conventional techniques.

Moreover, according to the present invention, the material mixture paste can be filled into the porous metal substrate efficiently, which significantly reduces the loss of the active material. Further, a precise definition of the interface between the filled portion and the unfilled portion can be achieved, which contributes to provide a good welding condition between the unfilled portion and a current collector plate.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a front view of a die nozzle used in the present invention.

FIG. 2 is an oblique view of a die coater used in the present invention.

DETAILED DESCRIPTION OF THE INVENTION

Figure 3:
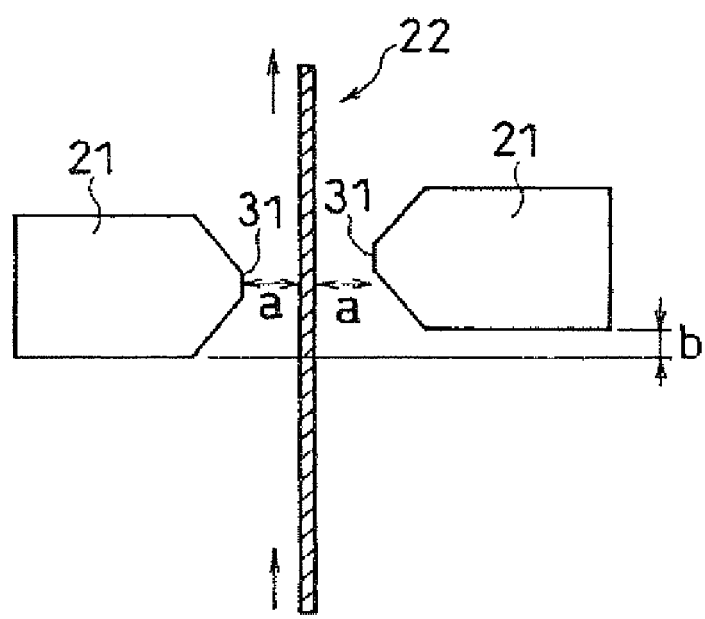
FIG. 3 is a diagram showing the positional relationship between die nozzles and a substrate.

A positive electrode plate for an alkaline storage battery of the present invention includes a strip-shaped porous metal substrate and a material mixture filled in the substrate. The porous metal substrate has an unfilled portion where the material mixture is not filled along at least one of the two longitudinal sides thereof. The important feature of the positive electrode for an alkaline storage battery of the present invention lies in that the porous metal substrate has a weight per unit area of 150 to 350 g/m$^2$, and that the material mixture contains an active material and an elastic polymer.

Because porous metal substrates having a low weight per unit area are produced at low costs, according to the present invention, the production cost for positive electrode can be reduced. Porous metal substrates having a low weight per unit area, however, are plagued with problems that its metal skeleton is easily broken and that its current collection network is also easily broken during the production of positive electrode plates. For this reason, porous metal substrates having a weight per unit area of greater than 350 g/m$^2$ have conventionally been employed.

In contrast, in the present invention, the material mixture contains an elastic polymer, and therefore flexibility is imparted to the positive electrode. As such, the problems as described above rarely occur. Accordingly, porous metal substrates having a weight per unit area of 150 to 350 g/m$^2$ can be utilized effectively. From the viewpoint of achieving low costs, it is further preferred that the porous metal substrate have a weigh per unit area of 190 to 250 g/m$^2$.

When the porous metal substrate has a weight per unit area of less than 150 g/m$^2$, the handling of the substrate will be difficult, and it will be difficult to prevent the breaking of a current collection network and the formation of burrs. Further, due to the low strength of the substrate, it will be difficult to continuously fill the material mixture paste into the substrate when in a hoop shape. Conversely, when the porous metal substrate has a weight per unit area of above 350 g/m$^2$, the reduction of production costs for positive electrode plates cannot be achieved. Further, because the substrate will account for a higher percentage by volume in an electrode plate, the electrode plate will have a low capacity.

The porous metal substrate is preferably composed of iron plated with nickel or nickel. Particularly preferred is nickel.

When producing the positive electrode using a porous metal substrate having a low weight per unit area, the formation of burrs is more likely compared to the case of using conventional substrates. In view of this, from the viewpoint of enhancing the effect to prevent a short-circuit in the battery due to burrs, the surface of the substrate is preferably covered with a surface material mixture layer having a thickness of 10 to 100 μm. In other words, the substrate preferably carries the material mixture in an amount exceeding the volume of the pores of the substrate.

The elastic polymer preferably has a glass transition temperature of −100 to +20° C. When the glass transition temperature is less than −100° C., the effect of the elastic polymer to bond the active material will be small. Conversely, when the glass transition temperature is above +20° C., sufficient flexibility might not be imparted to the positive electrode. The addition of an elastic polymer having a glass transition temperature of −100 to +20° C. to the material mixture provides a material mixture with appropriate flexibility. Accordingly, in the rolling step and the cutting step of the electrode plate, the separation of the material mixture can be prevented. Also, the formation of cracks during the fabrication of the electrode group can be prevented.

Preferred examples of the elastic polymer having the above-described physical properties include copolymers of tetrafluoroethylene and propylene, and copolymers of tetrafluoroethylene, propylene and vinylidene fluoride. Among the latter copolymers, particularly preferred are those having a vinylidene fluoride unit in an amount of less than 5 mol % because they have good alkali resistance. Styrene butadiene rubber (SBR) and perfluoroelastomer are also preferably used.

The amount of the elastic polymer contained in the material mixture is preferably 0.2 to 5 parts by weight per 100 parts by weight of the active material, more preferably 0.5 to 3 parts by weight. When the amount of the elastic polymer is too large, the discharge characteristics and the positive electrode capacity will be decreased. Conversely, when the amount of the elastic polymer is too small, the flexibility of the positive electrode will be reduced, decreasing the current collecting efficiency or facilitating the formation of burrs and cracks on the positive electrode.

From the viewpoint of improving the current collecting efficiency, the material mixture preferably contains a conductive material. Examples of the conductive material include metal cobalt powders, cobalt hydroxide and cobalt oxyhydroxide. Among them preferred is cobalt oxyhydroxide, more preferably cobalt oxyhydroxide having an oxidation number of 2.9 to 3.4. When nickel oxide particles carrying, as the conductive material, cobalt oxyhydroxide having an oxidation number of 2.9 to 3.4 on the surface thereof are used as the active material, the use of a small amount of the conductive material efficiently improves the current collecting efficiency. The nickel oxide particles carrying cobalt oxyhydroxide on the surface thereof can be produced by treating nickel oxide particles carrying cobalt hydroxide on the surface thereof with heat alkali.

The amount of the conductive material contained in the material mixture is usually 2 to 15 parts by weight per 100 parts by weight of the active material. When cobalt oxyhydroxide is carried on the active material surface, the amount of cobalt oxyhydroxide is preferably 3 to 10 parts by weight per 100 parts by weight of the active material.

Hereinafter, a positive electrode plate for an alkaline storage battery of the present invention will be described with reference to an example of the production method therefor.

First, a material mixture paste is prepared by dispersing a material mixture in a liquid component. The material mixture contains an active material and an elastic polymer as indispensable components. The material mixture can further contain a conductive material, a thickener, etc. In particular, a thickener is effective in controlling the viscosity of the material mixture paste.

Preferred examples of the thickener for use include cellulose-based thickeners such as carboxymethyl cellulose (CMC) and methyl cellulose (MC), and viscosity-enhancing polysaccharides such as xanthan gum, guar gum, carrageenan and diutan gum. The amount of the thickener contained in the material mixture paste is usually 0.05 to 0.3 parts by weight per 100 parts by weight of the active material.

From the viewpoint of imparting appropriate thixotropy to the material mixture paste, viscosity-enhancing polysaccharides are preferably used. Further, viscosity-enhancing polysaccharides are excellent from the viewpoint of improving the cycle characteristics of alkaline storage batteries because they are not easily dissolved in aqueous alkaline solutions compared to cellulose-based thickeners.

In order to fill the paste into the pores of the substrate, the paste needs to be fluid to some extent. However, after the paste is filled into the substrate, the paste should be retained in the position where it was filled to prevent the paste from dripping. In order to satisfy the requirements, it is preferred to use a paste having high thixotropy, that is, a paste having a low viscosity at high shear and a high viscosity at low shear. Particularly, because the present invention uses a porous metal substrate having a low weight per unit area, it is desirable that the dripping be prevented by using a paste having high thixotropy.

In the present invention, the thixotropy of the paste is evaluated in terms of viscosity ratio: viscosity at 2 rpm/viscosity at 20 rpm. The viscosity of the paste is measured at 25° C. A paste suitable to be filled into a substrate having a low weight per unit area has a viscosity at 20 rpm of 3 to 15 Pa·s and a viscosity ratio of not less than 2. When the viscosity at 20 rpm is less than 3 Pa·s, the dripping may occur. Conversely, when the viscosity at 20 rpm is above 15 Pa·s, it may be difficult to fill the paste into the pores of the substrate. When the viscosity ratio is less than 2, the paste may not have a preferred balance of the filling property and the fluidity. More preferably, the viscosity ratio is not less than 3. There is a limit in increasing the viscosity ratio, and the upper limit is about 7. The paste preferably has a viscosity at 2 rpm of 10 to 70 Pa·s.

From the viewpoint of preventing the spread of the material mixture paste from the filled portion to the unfilled portion, the combined use of the cellulose-based thickener and the viscosity-enhancing polysaccharide is preferred as the thickener. Particularly, the combined use of xanthan gum and CMC is preferred.

Xanthan gum is a water soluble polysaccharide, and its aqueous solution has a higher viscosity-enhancing capability than CMC aqueous solution. Accordingly, the use of xanthan gum is effective not only in uniformly dispersing the active material in the material mixture paste but also in preventing the spread of the material mixture paste into the unfilled portion. However, the use of only xanthan gum may result in excessively high viscosity. For this reason, from the viewpoint of optimizing the fluidity of the material mixture paste, the combined use of xanthan gum and CMC is effective.

When CMC and xanthan gum are used together, the weight ratio between CMC and xangthan gum is preferably CMC: xanthan gum=20:80 to 40:60. The total amount of CMC and xanthan gum is preferably 0.1 to 0.4 parts by weight per 100 parts by weight of active material.

The porous metal substrate is preferably one having a controlled thickness produced by pressing a hooped original material made of a porous metal having a weight per unit area of 150 to 350 g/m$^2$. The thickness of the porous metal substrate is controlled according to the desired electrode plate design. The porous metal substrate preferably has a thickness of 200 to 1500 μm. When the thickness of the substrate is less than 200 μm, the size of the pores in the substrate will be small, which might prevent the material mixture paste from entering the pores. Conversely, when the thickness of the substrate is above 1500 μm, in the method of spraying the paste from a die coater, the pressure will be insufficient and the paste might not be filled into the substrate.

The porosity of the porous metal substrate is preferably controlled to 88 to 97%. When the porosity is less than 88%, the permeation of the paste into the substrate might be decreased. Conversely, when the porosity is above 97%, the substrate will have low strength, making it difficult to continuously fill the material mixture paste into the substrate when in a hooped shape.

A description is now given of an example of the step of applying the material mixture paste onto the obtained porous metal substrate.

Preferably, the material mixture paste is applied onto the hooped porous metal substrate in a stripe pattern to form at least one unfilled portion where the material mixture is not filled. The material mixture paste having the viscosity and viscosity ratio mentioned previously is easily filled into the substrate, and it is unlikely to spread into the unfilled portion. The unfilled portion positioned between the filled portions preferably has a width of 1 to 10 mm, but the width is not limited thereto.

The substrate filled with the material mixture paste is dried. The dried substrate filled with the material mixture paste is then rolled to give a hooped electrode plate. The electrode plate is cut into a predetermined size to finally give a positive electrode plate. In the step of cutting the electrode plate, the electrode plate is cut along the unfilled portion, whereby the cut edge serves as an exposed portion of the substrate to which a current collector plate or lead is welded. As such, a step of removing the material mixture having been filled into the substrate can be omitted. Accordingly, the production method of the positive electrode plate can be simplified, and the loss of the active material can be prevented. Further, the separation of the active material can also be prevented by cutting the electrode plate along the unfilled portion.

It is effective to use a die coater as shown in FIGS. 1 and 2 when the material mixture paste is filled into the porous metal substrate. As shown in FIG. 2, at least a pair of die nozzles 21 are placed facing towards each other with a gap having a predetermined width therebetween. A substrate 22 passes through the gap in the longitudinal direction thereof. The pair of die nozzles 21 facing towards each other spray a material mixture paste 23 to the passing substrate 22, during which the material mixture paste 23 is filled into the substrate 22 in a stripe pattern to form an unfilled portion 24. In order to achieve such application, the die nozzles 21 preferably have a slit-shaped outlet 11 as shown in FIG. 1.

The die nozzle 21 of FIG. 1 has a slit-shaped outlet 11 for spraying the material mixture paste. The slit-shaped outlet 11 is divided into a plurality of sections by a partition 12. The number of the partition 12 is not limited to one. Two partitions or more may be arranged according to the required number of unfilled portions. Because the section shielded by the partition does not spray the material mixture paste, an unfilled portion is formed on the portion of the substrate corresponding to the partition. As a result, the material mixture paste is applied in a stripe pattern.

The die nozzle may be composed of a combination of a plurality of units, each unit having a slit-shaped outlet for spraying the material mixture paste. In this case, the plurality of units are arranged such that their slit-shaped outlets are aligned in a line.

In the case of using a plurality of die nozzles 21 facing towards each other with a gap having a predetermined width therebetween as shown in FIG. 2, it is preferred that, as shown in FIG. 3, the slit-shaped outlets 31 for spraying the material mixture paste be arranged such that the slit-shaped outlets 31 are displaced from each other by a distance of 1 to 5 mm (the width "b" in FIG. 3) in the direction in which the substrate passes. By arranging the facing die nozzles 21 such that they are displaced from each other by a distance of 1 mm or more, as the paste enters the pores in the substrate 22, the air trapped in the pores gradually moves to a portion not filled with the paste. Thereby, it is possible to bring the paste filling rate of the substrate 22 close to the most dense state. The distance (the width "a" in FIG. 3) between the substrate surface and the nozzle tip (the slit-shaped outlet) is preferably 10 to 500 μm.

If the slit-shaped outlets 31, each positioned at each side of the substrate, are opposed such that they are in exact agreement with each other, when the paste enters the pores in the substrate 22 simultaneously from both sides of the substrate 22, air might be left in the center portion of the substrate in the thickness direction. Conversely, when the amount of the displacement (the width "b" in FIG. 3) is 5 mm or more, the substrate might be curved in the thickness direction, causing a variation in thickness of the material mixture layer.

When the material mixture paste is filled into a porous metal substrate having pores therein, the width of the material mixture paste actually filled into the substrate (the width of the filled portion) varies relative to the width of the slit-shaped outlet of the die nozzle. In other words, the actual width of the filled portion is not always the same as the width of the slit-shaped outlet of the die nozzle. Such difference is caused by the variation in the viscosity of the paste and the wettability of the substrate. The width of the unfilled portion varies according to the variation of the width of the filled portion, causing a variation in capacity and size of the resulting positive electrode plate.

From the viewpoint of stabilizing the variation in width of the filled portion, it is preferred that the correlations among the paste viscosity, the paste spraying rate, the pressure around the slit-shaped outlet, the distance between the die nozzle and the substrate, the paste filling rate and the width of the filled portion be examined in advance, the result of which is then fed back to the application step. As a preferred example, the amount of the paste filled in the substrate and the width of the filled portion are monitored. Based on the information obtained from the monitoring, the distance between the die nozzle and the substrate or the flow rate of the material mixture paste sprayed from the die nozzle is controlled. The amount of the material mixture paste filled in the substrate can be monitored with the use of an X-ray weight analyzer or β-ray weight analyzer. The width of the filled portion can be monitored with the use of an image recognition device.

Figure 4:
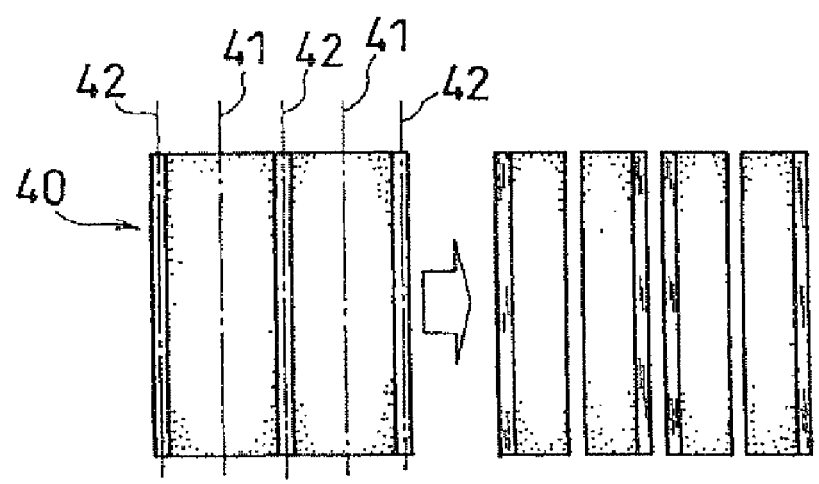
FIG. 4 is a diagram showing an example of the step of cutting a positive electrode plate obtained by filling a material mixture paste in a substrate in a stripe pattern.
Figure 5:
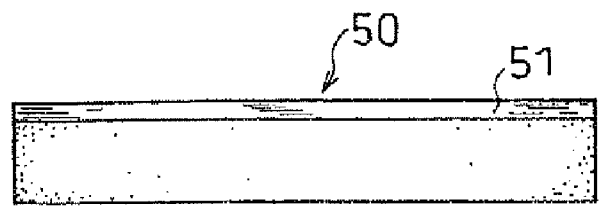
FIG. 5 is a front view of a positive electrode cut into a predetermined size.
Figure 6:
FIG. 6(A) is a cross sectional view of the main part of a positive electrode of the present invention.
FIG. 6(B) is a cross sectional view of the main part of a conventional positive electrode plate.
Figure 6:
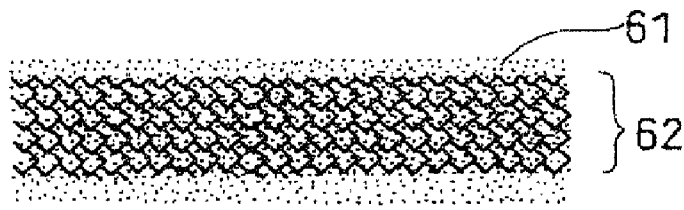

The volume of the material mixture paste filled in the substrate is preferably 95 to 150% of the volume of the pores in the substrate, more preferably 100 to 130%. By adjusting this amount (paste filling rate) to 95% or more, when an electrode plate 40 is cut along the cutting lines 41 and 42 as shown in FIG. 4, the area of the substrate metal exposed at the cross section formed along the cutting line 41 can be reduced. After the cutting step, a positive electrode plate 50 as shown in FIG. 5 can be obtained. The positive electrode plate 50 has an unfilled portion 51 formed along one side of the two longitudinal sides thereof. The unfilled portion 51 corresponds to the area cut along the cutting line 42. When the paste filling rate is above 100%, because a surface material mixture layer 61 is formed on the electrode plate as shown in FIG. 6(A), the exposure of the porous metal 62 at the electrode surface can be prevented. As shown in FIG. 6(B), in a conventional positive electrode plate, the material mixture does not appear on the substrate surface. In the present invention, however, because the separation of the material mixture can be prevented by the elastic polymer, it is possible to produce an electrode plate having the structure shown in FIG. 6(A).

The formation of the surface material mixture layer on the electrode plate can prevent cracks or short-circuiting that occurs when the positive electrode and a negative electrode are spirally wound with a separator interposed therebetween. As a result, the separator can be made thinner, and a significant increase in battery capacity can be achieved. However, when the filling rate is above 150%, the thickness of the material mixture might be nonuniform due to dripping of the material mixture paste, or the current collecting efficiency might be decreased.

A description is now given of an embodiment in which a compressed gas is sprayed onto a portion of the substrate corresponding to the unfilled portion while the material mixture paste is filled into the porous metal substrate.

As described previously, the filling step can be performed more efficiently by spraying a compressed gas onto the unfilled portions positioned at the external ends of the filled portion(s) and/or the unfilled portion positioned between filled portions when the material mixture paste is continuously filled into the porous metal substrate.

Since the material mixture paste has appropriate fluidity so that it can be filled into the substrate easily, the material mixture paste tends to spread to the unfilled portion immediately after the paste is filled into the substrate. By spraying a compressed gas onto the unfilled portion, the material mixture paste that would otherwise spread from the filled portion to the unfilled portion can be pushed back to the filled portion.

When the pressure of the compressed gas is too low, the effect of preventing the material mixture paste from spreading will be small. Conversely, when the pressure is too high, the material mixture paste will be spattered. Accordingly, the pressure of the compressed gas is preferably controlled to 0.01 to 0.30 MPa.

As for the direction from which the compressed gas is sprayed, the compressed gas is preferably sprayed from the direction at an angle of 0 to 30° with respect to the plane (reference plane) perpendicular to the substrate surface, the plane including the interface between the filled portion and the unfilled portion. The spread of the material mixture paste can be prevented efficiently by spraying the compressed gas from the direction at the unfilled portion side at an angle of 0 to 30° with respect to the reference plane.

The compressed gas for use is a gas that does not poison the material mixture paste. Specifically, compressed air, high pressure nitrogen or high pressure helium can be used.

As for the device for achieving the filling step described above, a device as shown in FIG. 9 is preferred.

A porous metal substrate 71 in a hoop shape is released from an uncoiler 72, and then introduced into a gap between a pair of die nozzles 73. The pair of die nozzles 73 each have a slit-shaped outlet for spraying a material mixture paste, and they are arranged facing towards each other with the gap having a predetermined width therebetween. A substrate 71 passes through the gap at a predetermined speed, during which a material mixture paste 74 sprayed from the slit-shaped outlets of the die nozzles 73 disposed at both sides is filled into the substrate 71. Compressed gas spraying outlets 76 are disposed at both ends of the slit-shaped outlet of each die nozzle 73. A compressed gas is sprayed from the compressed gas spraying outlets 76 onto the unfilled portions 77 (exposed portions of the substrate). The compressed gas prevents the material mixture paste from spreading from the filled portion 75 to the unfilled portions 77. The substrate filled with the material mixture paste is then introduced into a drying oven 78. The dried substrate is finally wound up by a coiler 79.

Figure 9:
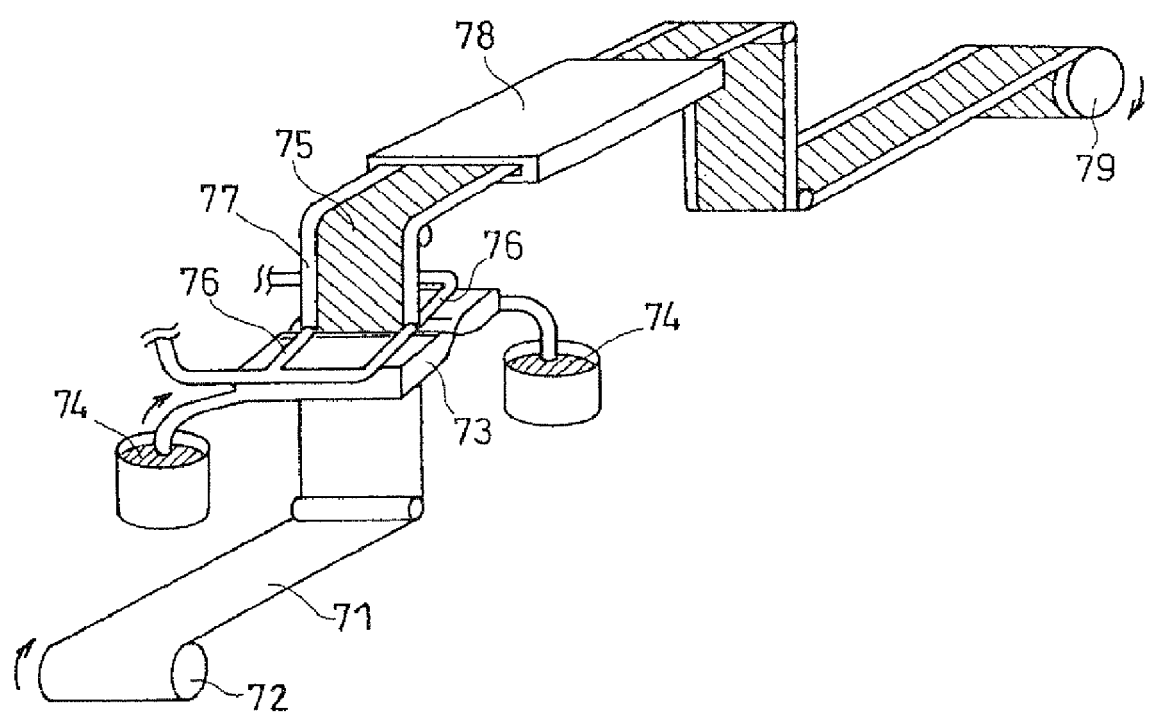
FIG. 9 is an oblique view of another die coater used in the present invention.

Although, in the device of FIG. 9, only one filled portion 75 is formed, it is also possible to form a plurality of tilled portions 75 on the substrate in a stripe pattern by, for example, alternately disposing a plurality of compressed gas spraying outlets 76 and a plurality of die nozzles 73 in parallel with each other and using a porous metal substrate having a greater width.

Hereinafter, the examples of the present invention will be described.

EXAMPLE 1

(i) Active Material Carrying Conductive Material on the Surface Thereof

Particles of nickel hydroxide solid solution serving as an active material were prepared by the following known method. Specifically, an aqueous solution of sodium hydroxide was added dropwise to another aqueous solution dissolving nickel sulfate mainly with predetermined amounts of cobalt sulfate and zinc sulfate therein while adjusting the pH of the aqueous solution with an aqueous ammonia, whereby spherical particles of nickel hydroxide solid solution were deposited.

The obtained particles of nickel hydroxide solid solution were then washed with water and dried. The resulting particles, which hereinafter may be referred to as core particle, had a mean particle size of 10 µm and a specific surface area of 12 $m^2/g$. Note that the mean particle size was measured by a laser diffraction particle size analyzer and the specific surface area was measured by BET method.

Subsequently, fine particles of cobalt hydroxide serving as a conductive material were carried onto the particles of nickel hydroxide solid solution (core particle) by the following known method. Specifically, the particles of nickel hydroxide solid solution and an aqueous solution of cobalt sulfate (1 mol/L) were slowly added with stirring to an aqueous solution of sodium hydroxide while adjusting the pH of the aqueous solution to be 12 at 35° C. Thereby, fine particles of cobalt hydroxide (β type) were deposited on the surface of the particles of nickel hydroxide solid solution. The resulting particles had a mean particle size of 10 µm and a specific surface area of was 12 $m^2/g$. Note that the mean particle size was obtained from an SEM image and the specific surface area was measured by BET method.

The particles of nickel hydroxide solid solution carrying fine particles of cobalt hydroxide on the surface thereof were held in a treatment vessel, to which an aqueous alkaline solution of 45 wt % concentration was added at a rate of 0.07 L/Kg and mixed. Hot air at a temperature of 100° C. was then sent thereto at a rate of 4 L/min/Kg for drying. Thereby, the cobalt hydroxide on the surface was converted into highly conductive cobalt oxyhydroxide having an average cobalt valence of 3.1.

(ii) Material Mixture Paste

The particles of nickel hydroxide solid solution carrying cobalt oxyhydroxide (conductive material) on the surface thereof were used as an active material. The amount of the conductive material was 10 parts by weight per 100 parts by weight of the active material.

As a binder, an elastic polymer having a glass transition temperature of −3° C. was used. The elastic polymer was a copolymer containing a tetrafluoroethylene unit and a propylene unit at a molar ratio of 55:45 with a density of 1.55 $g/cm^3$. The elastic polymer was used as an aqueous dispersion containing 35 wt % elastic polymer. This aqueous dispersion is available from Asahi Glass Co, Ltd. under the trade name of AFLAS.

As a thickener, carboxymethyl cellulose (CMC) and xanthan gum were used. Carboxymethyl cellulose (CMC) was used as 1 wt % aqueous solution.

A material mixture paste was prepared by the following procedure with the use of the above-prepared materials.

First, 100 parts by weight of the active material carrying the conductive material thereon and 0.2 parts by weight of xanthan gum were introduced into a kneader, which was then thoroughly mixed by mixing blades. Five parts by weight of CMC aqueous solution was slowly added dropwise to the kneader while mixing, and 3 parts by weight of the elastic polymer was further added. Thereby, there was prepared a material mixture paste containing the active material carrying the conductive material and the elastic polymer at a weight ratio of 100:3 with a water content of 17 wt %.

The resultant material mixture paste had a viscosity of 25 Pa·s at 2 rpm and 5 Pa·s at 20 rpm. The viscosity ratio (viscosity at 2 rpm/viscosity at 20 rpm) was 5. A paste like this has a decreased viscosity when the shear rate γ is increased so that the material mixture paste is sprayed from the slit-shaped outlet of the die nozzle very smoothly. Further, when the substrate filled with the paste is dried, shear force is not applied to the paste and the viscosity of the paste is increased, the paste does not drip. In other words, the paste has very suitable rheology for the filling step using a die coater.

(iii) Positive Electrode Plate

The above-produced material mixture paste was filled into a 160 mm wide hooped porous metal substrate made of nickel in a stripe pattern such that one unfilled portion where the material mixture was not filled was formed in the center of the porous metal substrate. The porous metal substrate used here was produced by plating a foamed urethane sheet with nickel, followed by baking at 600° C. to remove urethane, after which, the resultant original material of porous metal was pressed to have a thickness of 700 μm. The porous metal substrate had a weight per unit area of 200 g/m² and a porosity of 97%.

In the step of filling the material mixture paste into the substrate, from a pair of die nozzles arranged facing towards each other with a gap having a predetermined width therebetween, the material mixture paste was sprayed in a stripe pattern onto the substrate passing through the gap in the longitudinal direction. The pair of die nozzles were arranged such that the slit-shaped outlets for spraying the material mixture paste were displaced from each other by a distance of 0.5 μm in the direction in which the substrate passed. The volume of the material mixture paste filled into the substrate was adjusted to 130% of the pore volume of the substrate (a paste filling rate of 130%).

The slit-shaped outlets of the die nozzles for spraying the material mixture paste each had a width of 148 mm. The portion 68 to 80 mm in from one edge of the slit-shaped outlet was shielded by a partition having a width of 12 mm. Because the portion shielded by the partition did not spray the paste, an unfilled portion having a width of 12 mm was formed in the center of the substrate.

During the filling of the material mixture paste into the substrate, the width of the filled portions was monitored by a camera. According to a variation in the width of the filled portion, the distance between the facing die nozzles was automatically adjusted. The distance between each of the die nozzles and the substrate was appropriately adjusted within the range of 10 to 500 μm.

The substrate filled with the material mixture paste was then dried with hot air at 110° C. for 5 minutes. The dried substrate filled with the material mixture was rolled by a roll press to have a thickness of 500 μm to give an electrode plate in a hoop shape. The obtained electrode plate was cut along at least the unfilled portions as shown in FIG. 4. As a result, a positive electrode plate A as shown in FIG. 5 having an unfilled portion where the material mixture was not filled along one side of the two longitudinal sides thereof was obtained. The main part of the positive electrode plate A had a cross section as shown in FIG. 6(A). The unfilled portion was folded twice to increase strength because a current collector plate would later be welded thereto.

COMPARATIVE EXAMPLE 1

(i) Active Material Carrying Conductive Material on the Surface Thereof

An active material carrying a conductive material on the surface thereof was produced in the same manner as in Example 1 except for the following.

Particles of nickel hydroxide solid solution carrying fine particles of cobalt hydroxide were held in a treatment vessel, to which an aqueous alkaline solution of 45 wt % concentration was added at a rate of 0.05 L/Kg and mixed. Hot air at a temperature of 60° C. was then sent thereto at a rate of 1 L/min/Kg for drying. Thereby, the cobalt hydroxide on the surface was converted into cobalt oxyhydroxide having an average cobalt valence of 2.8.

(ii) Material Mixture Paste

As an active material, the above-produced particles of nickel hydroxide solid solution carrying cobalt oxyhydroxide (conductive material) on the surface thereof were used. The amount of the conductive material was 10 parts by weight per 100 parts by weight of the active material.

As a binder, polytetrafluoroethylene (PTFE) was used. An aqueous dispersion containing 60 wt % PTFE was prepared.

As a thickener, carboxymethyl cellulose (CMC) was used. An aqueous solution containing 1 wt % carboxymethyl cellulose (CMC) was prepared.

Using the above materials, a material mixture paste was prepared by the following procedure.

First, 100 parts by weight of the active material carrying the conductive material thereon was introduced into a kneader and thoroughly mixed by mixing blades, during which 2.5 parts by weight of water and 20 parts by weight of CMC aqueous solution were slowly added dropwise to the kneader, and 2 parts by weight of PTFE was further added. Thereby, there was prepared a material mixture paste containing the active material carrying the conductive material and PTFE at a weight ratio of 100:2 with a water content of 19 wt %.

The resultant material mixture paste had a viscosity of 5 Pa·s at 2 rpm and 2 Pa·s at 20 rpm. The viscosity ratio (viscosity at 2 rpm/viscosity at 20 rpm) was 2.5.

(iii) Positive Electrode Plate

The above-prepared material mixture paste was filled into a 180 mm wide hooped porous metal substrate made of nickel. The porous metal substrate used here was produced by plating a foamed urethane sheet with nickel, followed by baking at 600° C. to remove urethane. The porous metal substrate had a thickness of 1000 μm, a weight per unit area of 400 g/m² and a porosity of 95%.

In the step of filling the material mixture paste into the substrate, the porous metal substrate in a hoop shape was continuously fed into a vessel holding the material mixture paste therein. In this method, the paste needs to be permeated into the substrate by immersing the hooped porous metal substrate in the vessel holding the material mixture paste. For this reason, the viscosity of the paste was reduced to the above-mentioned level (i.e., 5 Pa·s at 2 rpm and 2 Pa·s at 20 rpm).

After the material mixture paste was filled into the substrate, the surface of the substrate filled with the material mixture paste was smoothened by a roll smoother. Subsequently, the active material was removed by applying an ultrasonic wave to a predetermined portion of the electrode plate so as to form an unfilled portion similar to the electrode plate of Example 1 to which a current collector plate would be welded.

The substrate filled with the material mixture paste was dried with hot air at 110° C. for 15 minutes. The dried electrode plate was rolled by a roll press to have a thickness of 500 μm. The obtained electrode plate was then cut to give a positive electrode plate B as shown in FIG. 5. The main part of the positive electrode plate B had a cross section as shown in FIG. 6(B). The paste filling rate was 90%. The unfilled portion was folded twice to increase strength because a current collector plate would later be welded thereto.

[Evaluation of Electrode Plate]
(Condition of Positive Electrode Plate)

The positive electrode plates A and B were subjected to the following evaluation tests. The results are shown in Table 1.

Evaluation test 1: The maximum height of metal burrs formed during cutting and the number of the burrs were determined from SEM images.

Evaluation test 2: One thousand electrode groups, each electrode group produced by spirally winding the positive electrode plate and a well-known hydrogen storage alloy electrode with a 100 μm thick polypropylene separator therebetween, were produced. During the production of each electrode group, the rate (%) of the weight of the material mixture separated during the spirally winding step to the weight of the positive electrode plate was determined in percentage. The average of 1000 electrode groups was then calculated, which was referred to as separation rate of material mixture.

Evaluation test 3: One thousand electrode groups, each electrode group produced by spirally winding the positive electrode plate and a well-known hydrogen storage alloy electrode with a 100 μm thick polypropylene separator therebetween, were produced. The defective rate due to short-circuiting was determined.

Evaluation test 4: The rate (%) of the weight of the material mixture wasted (e.g., the material mixture separated by an ultrasonic wave in the production of the positive electrode plate B) to the weight of the material mixture used in the production of the positive electrode plate was determined in percentage, which was referred to as material mixture loss rate.

TABLE 1

| | Positive electrode plate A | Positive electrode plate B |
|---|---|---|
| Eval. 1 | Maximum height of burrs: 40 μm<br>Number of burrs: 1 | Maximum height of burrs: 150 μm<br>Number of burrs: 10 |
| Eval. 2 | Separation rate of material mixture: 0.01% or less | Separation rate of material mixture: 0.20% |
| Eval. 3 | Defective rate due to short-circuiting: 0%(0 article) | Defective rate due to short-circuiting: 2.5%(5 articles) |
| Eval. 4 | Material mixture loss rate: 0% | Material mixture loss rate: 15% |

As is evident from Table 1 in the positive electrode plate A having a paste filling rate of 130% and using a highly-binding and flexible binder with a low glass transition temperature, the number of burrs formed during the cutting step was extremely small compared to the positive electrode plate B, and the separation rate of the material mixture during the spirally winding step was also very small. Accordingly, even when a thin separator with a thickness of 100 μm was used in the positive electrode plate A, no defective electrode group due to short-circuiting was observed.

(Production of Alkaline Storage Battery)

Using the positive electrode plates A and B, FSC sized nickel-metal hydride storage batteries having a nominal capacity of 3300 mAh were produced. Specifically, the positive electrode plate and a negative electrode plate were spirally wound with a 100 μm thick hydrophilic-treated polypropylene separator interposed therebetween to form an electrode group. A current collector plate was welded to the porous metal (unfilled portion) of the electrode group exposed at the edge. The electrode group was then housed in a battery case. The negative electrode used here was a well-known hydrogen storage alloy electrode. A specified amount of alkaline electrolyte containing potassium hydroxide as the main solute dissolved therein at a concentration of 7 to 8 N was injected to the battery case. The opening of the battery case was then sealed, and the initial charge/discharge was performed. Hereinafter, a battery produced using the positive electrode plate A is referred to as battery A, and a battery produced using the positive electrode plate B is referred to as battery B.

(Active Material Utilization Rate)

As the initial charge/discharge, each battery was subjected to repeated (twice) charge/discharge cycles in which charging was performed at a charge rate of 0.1 C (1 C=3300 mA) for 15 hours and then discharging was performed at a discharge rate of 0.2 C for 6 hours. Subsequently, aging (the activation of the negative electrode alloy) was performed at 45° C. for 3 days, after which the active material utilization rate of the positive electrode plate was measured by changing the charge/discharge conditions. The results are shown in Table 2.

TABLE 2

| | Active material utilization rate | | |
|---|---|---|---|
| | 0.2 C | 1 C | 2 C |
| Positive electrode plate A | 102% | 95% | 92% |
| Positive electrode plate B | 100% | 90% | 80% |

The active material utilization rate shown in Table 2 is a rate of discharge capacity to theoretical capacity of the positive electrode of each battery expressed in percentage. The theoretical capacity of the positive electrode was calculated by multiplying the weight of nickel hydroxide in the positive electrode active material by an electric capacity of 289 mAh/g assuming that nickel hydroxide in the positive electrode active material undergoes one electron reaction.

The discharge capacity was measured by overcharging the battery at a charge rate shown in Table 2 and then discharging the same at a discharge rate of 0.2 C, 1 C and 2 C to a battery voltage of 0.8 V. Table 2 clearly indicates that the active material utilization rate of the battery A produced using the positive electrode plate A of the present invention was of a higher standard than that of the battery B produced using the positive electrode plate B of Comparative Example 1.

(Charge/Discharge Cycle Characteristics)

The charge/discharge cycle characteristics of the batteries A and B were investigated.

Figure 7:
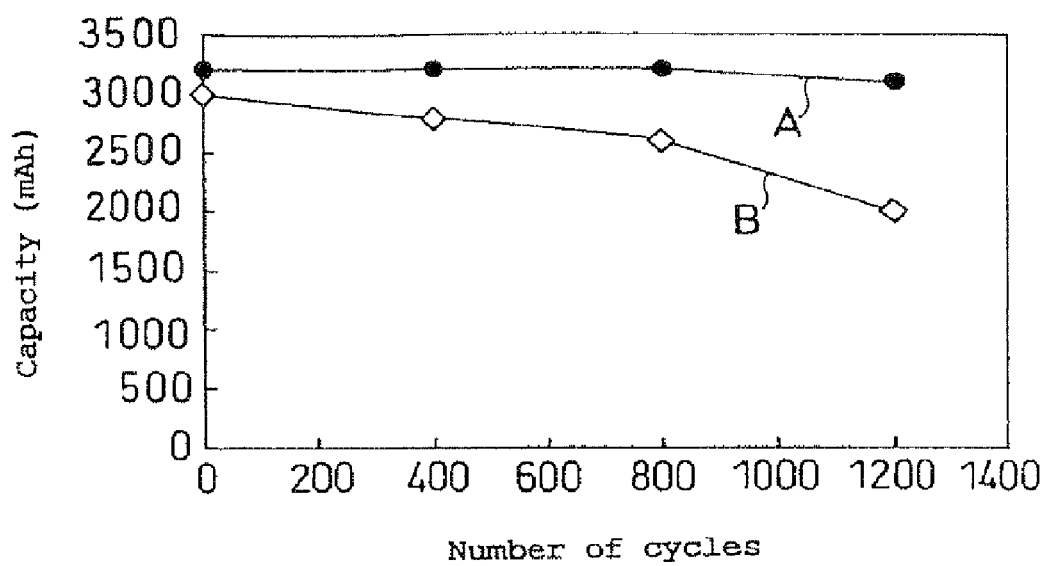
FIG. 7 is a graph showing the discharge capacity vs. the number of cycles for batteries A and B (Graph 1).

A charge/discharge cycle was performed as follows. Charging was performed by −ΔV (ΔV=0.01 V) control method at a charge rate of 1 C, after which discharging was performed at a discharge rate of 1 C to a battery voltage of 0.8 V. After every predetermined cycles, charging was performed by −ΔV (ΔV=0.01 V) control method at a charge rate of 1 C, after which discharging was performed at a discharge current of 10 A to a battery voltage of 0.4 V. The discharge capacity was measured at this time. FIG. 7 is a graph (referred to as Graph 1) showing the correlation between the discharge capacity measured at this time and the number of cycles. As is obvious from Graph 1, the battery A achieved a higher capacity than the battery B, and the capacity decrease after long-term cycle life test was suppressed.

Further, using the batteries A and B, battery packs, each battery pack including 10 batteries (which hereinafter may be referred to as unit cells) connected in series, were produced. The charge/discharge cycle characteristics of the battery packs were investigated.

Figure 8:
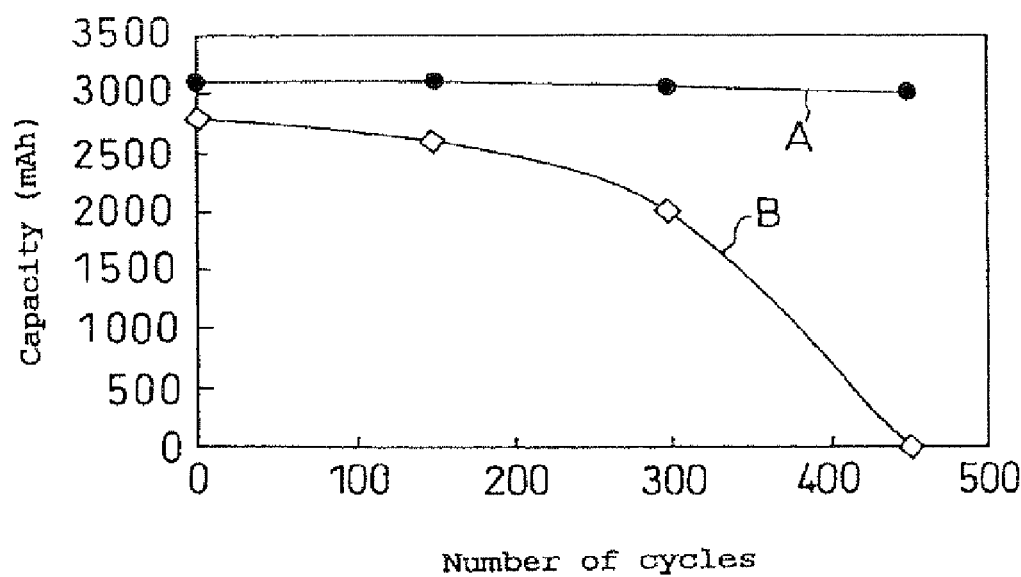
FIG. 8 is a graph showing the discharge capacity vs. the number of cycles for battery packs A and B (Graph 2).

A charge/discharge cycle was performed as follows. Charging was performed by ΔT (ΔT=3.0° C./min) control method at a charge rate of 10 A, after which auxiliary charging was performed by ΔT (ΔT=3.0° C./min) control method at a charge rate of 5 A. Subsequently, discharging was performed at a discharge current of 20 A to a pack voltage of 4 V. FIG. 8 is a graph (referred to as Graph 2) showing the correlation between the discharge capacity at this time and the number of cycles.

As is obvious from Graph 2, the battery pack A achieved a higher capacity than the battery pack B, and the capacity decrease after long-term cycle life test was suppressed. This tendency was more remarkable in the charge/discharge cycle characteristic test using the battery pack than using the single battery. This is because, since there is a variation in capacity among the unit cells contained in the battery pack, some unit cells are over-discharged when the battery pack is subjected to the charge/discharge cycle.

Once the battery is over-discharged, the capacity decreases because of the separation of the active material due to the generation of gas from the positive electrode, the melting of the separator due to the generation of heat, the decrease of the electrolyte by the operation of a safety valve and the increase of internal resistance.

On the other hand, according to the present invention, the active material is rarely separated in the spirally winding step to construct an electrode group and few burrs and cracks are formed in the electrode plate, compared to a conventional technique. Accordingly, short-circuiting between the positive and negative electrodes due to the melting of the separator and the capacity decrease due to the separation of the active material can be effectively prevented

EXAMPLE 2

Positive electrode plates were produced in the same manner as in Example 1 except that the paste filling rate was changed to those shown in Table 3.

[Evaluation]

The above-produced positive electrode plates were subjected to the following measurement. The results are shown in Table 3.

<i> The maximum height of metal burrs formed during the cutting step was determined.

<ii> One thousand electrode groups, each electrode group produced by spirally winding the positive electrode plate and a well-known hydrogen storage alloy electrode with a 100 μm thick polypropylene separator therebetween, were produced. During the production of each electrode group, the rate (%) of the weight of the material mixture separated during the spirally winding step to the weight of the positive electrode plate was determined in percentage. The average of 1000 electrode groups was then calculated, which was referred to as separation rate of material mixture.

<iii> The thickness was measured at arbitrary 3 points of the electrode plate before the cutting step. Then, the difference between the minimum thickness and the maximum thickness was determined.

<iv> The thickness range of the surface material mixture layer (i.e. the layer made of the material mixture covering the substrate surface) was measured.

TABLE 3

| Paste filling rate | 80% | 90% | 95% | 120% | 130% | 150% | 170% |
|---|---|---|---|---|---|---|---|
| Maximum height of burrs | 150 μm | 80 μm | 50 μm | 30 μm | 30 μm | 10 μm | 10 μm |
| Separation rate of material mixture | 0.20% | 0.10% | 0.01% | 0% | 0% | 0% | 0.20% |
| Thickness difference of electrode plate | 0.6 mm | 0.3 mm | 0.2 mm | 0.2 mm | 0.2 mm | 0.5 mm | 0.8 mm |
| Thickness range of surface material mixture layer (μm) | Metal substrate exposed | Metal substrate exposed | 0-50 | 10-80 | 10-100 | 40-110 | 0-200 |

Table 3 illustrates that, when the paste filling rate was 95% or more, metal burrs became small, and the separation rate of the active material and the variation in thickness also became small. As can be seen, there is a tendency that the higher the paste filling rate, the lower the separation rate of the active material. This is presumably due to the effect of the elastic polymer. However, when the paste filling rate was above 150%, the amount of the separated material mixture increased, and the variation in thickness of the electrode plate also increased.

EXAMPLE 3

Positive electrode plates were produced in the same manner as in Example 1 except that the amount of CMC per 100 parts by weight of the active material carrying the conductive material and the amount of xanthan gum per 100 parts by weight of the same were changed to those shown in Table 4 and that the paste viscosity and the viscosity ratio were changed to those shown in Table 4. Then, nickel-metal hydride storage batteries were produced in the same manner as in Example 1 except that the above-produced positive electrode plates were used.

[Evaluation]

The positive electrode plates and the nickel-metal hydride storage batteries produced above were subjected to the following measurement. The results are shown in Table 4.

<i> The variation of the paste filling rate was determined. Here, the paste filling amount was monitored by an X-ray weight analyzer during the step of filling the paste to determine the maximum amount and the minimum amount. Then, the difference between them was calculated. The percentage of the calculated value to the specification value (theoretical value of the paste filling rate determined from the porosity of the substrate) was referred to as variation of paste filling rate.

<ii> The active material utilization rate of the electrode plates was determined in the same manner as used for the battery A of Example 1.

TABLE 4

| Xanthan gum (part by weight) | 0.02 | 0.06 | 0.08 | 0.04 | 0.10 | 0.15 | 0.17 | 0.18 |
|---|---|---|---|---|---|---|---|---|
| CMC (part by weight) | 0.18 | 0.14 | 0.12 | 0.16 | 0.10 | 0.05 | 0.03 | 0.02 |
| 2 rpm (Pa·s) | 5 | 8 | 12 | 12 | 15 | 25 | 38 | 80 |
| 20 rpm (Pa·s) | 2 | 3 | 3 | 8 | 6 | 8 | 10 | 12 |
| Viscosity ratio (2 rpm/20 rpm) | 2.5 | 2.7 | 4 | 1.5 | 2.5 | 3.1 | 3.8 | 6.7 |

TABLE 4-continued

| Variation of paste filling rate | 9% | 7% | 5% | 7% | 5% | 5% | 5% | 7% |
|---|---|---|---|---|---|---|---|---|
| Active material ulitization rate | 99% | 100% | 102% | 99% | 102% | 102% | 102% | 100% |

Table 4 illustrates that, when the material mixture paste had a viscosity at 20 rpm of 3 to 15 Pa·s and a viscosity ratio of 2 or more, the variation of paste filling rate was small and good active material utilization rate was obtained. It is also clear from Table 4 that the preferred viscosity at 2 rpm is 10 to 70 Pa·s. When the material mixture paste had a viscosity and a viscosity ratio which were out of the range, the variation of paste filling rate was relatively large and the active material utilization rate was relatively low. The reason for this is presumably because the material mixture paste was not sufficiently permeated into the substrate or because even if the material mixture paste was sufficiently permeated into the substrate, the material mixture paste dripped due to its low viscosity.

EXAMPLE 4

Positive electrode plates were produced in the same manner as in Example 1 except that the amount of the binder (elastic polymer) contained in the material mixture per 100 parts by weight of the active material was changed to those shown in Table 5. Then, nickel-metal hydride storage batteries were produced in the same manner as in Example 1 except that the above-produced positive electrode plates were used.
[Evaluation]
The above-produced positive electrode plates and nickel-metal hydride storage batteries were subjected to the following measurement. The results are shown in Table 5.
<i> One thousand electrode groups, each electrode group produced by spirally winding the positive electrode plate and a well-known hydrogen storage alloy electrode with a 100 μm thick polypropylene separator therebetween, were produced. During the production of each electrode group, the rate (%) of the weight of the material mixture separated during the spirally winding step to the weight of the positive electrode plate was determined in percentage. The average of 1000 electrode groups was then calculated, which was referred to as separation rate of material mixture.

<ii> One thousand electrode groups, each electrode group produced by spirally winding the positive electrode plate and a well-known hydrogen storage alloy electrode with a 100 μm thick polypropylene separator therebetween, were produced. The defective rate due to short-circuiting was determined.

<iii> The active material utilization rate of the positive electrode plates was determined in the same manner as used for the battery A of Example 1.

TABLE 5

| | Binder amount (part by weight) | | | | | | | |
|---|---|---|---|---|---|---|---|---|
| | 0 | 0.1 | 0.2 | 1 | 2 | 3 | 5 | 6 |
| Separation rate of material mixture | 0.16% | 0.12% | 0.05% | 0% | 0% | 0% | 0% | 0% |
| Defective rate due to short-circuiting | 5% | 3% | 0.7% | 0.3% | 0% | 0% | 0% | 0% |
| Active material utilization rate | 97% | 99% | 101% | 102% | 102% | 102% | 101% | 98% |

Table 5 illustrates that batteries having a low defective rate due to short-circuiting and an excellent active material utilization rate were obtained when the amount of binder was 0.2 to 5 parts by weight per 100 parts by weight of the active material, preferably 1 to 5 parts by weight. As can be seen, the defective rate due to short-circuiting tends to be lower with an increased amount of the binder. This is presumably because the flexibility of the positive electrode plate was increased and the formation of cracks or burrs was prevented. It is also clear from Table 5 that the separation of the active material does not easily occur when the amount of the binder is increased. However, when the amount of the binder was above 5 parts by weight per 100 parts by weight of the active material, the active material utilization rate decreased. Accordingly, the amount of the binder is preferably 5 parts by weight or less.

REFERENCE EXAMPLE 1

(i) Material Mixture Paste
A material mixture paste with a water content of 20 wt % was prepared by mixing 100 parts by weight of nickel hydroxide, 10 parts by weight of cobalt oxide, 0.2 parts by weight of CMC as a thickener, 0.3 parts by weight of PTFE as a binder and an appropriate amount of water.
The nickel hydroxide had a mean particle size of 10 μm and a specific surface area of 10 $m^2/g$. The cobalt oxide had a mean particle size of 0.3 μm and a specific surface area of 20 $m^2/g$. Note that the mean particle size was determined by a laser diffraction particle size analyzer, and the specific surface area was measured by BET method.
The obtained material mixture paste had a viscosity of 40 Pa·s at 2 rpm and 10 Pa·s at 20 rpm. The viscosity ratio (viscosity at 2 rpm/viscosity at 20 rpm) was 4.
(ii) Positive Electrode Plate
The above-prepared material mixture paste was filled into a porous metal substrate made of nickel in a hoop shape using a device as shown in FIG. 9. The porous metal substrate used here was a substrate having a width of 80 mm, a thickness of 1.5 mm (1500 μm), a weight per unit area of 350 $g/m^2$ and three-dimensionally connected pores with a mean pore size of 200 μm.

The porous metal substrate in a hoop shape was released from an uncoiler, and then introduced into a 1.65 mm gap between a pair of die nozzles arranged facing towards each other from below to above. The material mixture paste was sprayed from the slit-shaped outlets of the pair of die nozzles and filled into the substrate. Compressed gas spraying outlets were arranged at both ends of the slit-shaped outlet of each of the die nozzles. Compressed air was sprayed therefrom. The slit-shaped outlets had a width of 60 mm, and thus the filled portion had a width of 60 mm. On the external ends of the filled portion were formed unfilled portions having a width of 10 mm. The paste filling rate was 110%.

The compressed air sprayed onto the external ends of the filled portion had a pressure of 0.05 MPa. The compressed air was sprayed from a direction perpendicular to the substrate surface. The substrate filled with the material mixture paste was then introduced into a drying oven and dried at 120° C. at 5 minutes, after which the dried substrate was wound up by a coiler and then rolled to have a thickness of 0.7 mm. The obtained electrode plate in a hoop shape was cut into a predetermined size to give a positive electrode plate for an alkaline storage battery.

REFERENCE EXAMPLE 2

A positive electrode plate for an alkaline storage battery was produced in the same manner as in Reference Example 1 except that 0.05 parts by weight of CMC per 100 parts by weight of nickel hydroxide and 0.15 parts by weight of xanthan gum per 100 parts by weight of the same were used as the thickener.

REFERENCE EXAMPLE 3

A positive electrode plate for an alkaline storage battery was produced in the same manner as in Reference Example 1 except that a punched iron sheet plated with nickel having a thickness of 80 μm, a pore size of 1.5 mm and a porosity of 40% in a hoop shape was used as the substrate.

REFERENCE EXAMPLE 4

A positive electrode plate for an alkaline storage battery was produced in the same manner as in Reference Example 1 except that the width of the porous metal substrate was changed to 160 mm, that two pairs of die nozzles arranged in parallel were used, that compressed gas spraying outlets were disposed between the two pairs of die nozzles and the external ends of the two pairs of die nozzles, and that filled portions each having a width of 60 mm was formed in a stripe pattern. The unfilled portion formed between the filled portions had a width of 20 mm.

REFERENCE EXAMPLE 5

A positive electrode plate for an alkaline storage battery was produced in the same manner as in Reference Example 4 except that 0.05 parts by weight of CMC per 100 parts by weight of nickel hydroxide and 0.15 parts by weight of xanthan gum per 100 parts by weight of the same were used as the thickener.

REFERENCE EXAMPLE 6

A positive electrode plate for an alkaline storage battery was produced in the same manner as in Reference Example 4 except that a punched iron sheet plated with nickel having a thickness of 160 μm, a pore size of 1.5 mm and a porosity of 40% in a hoop shape was used as the substrate.

REFERENCE EXAMPLE 7

A positive electrode plate for an alkaline storage battery was produced in the same manner as in Reference Example 1 except that the spraying of the compressed air was not performed.

REFERENCE EXAMPLE 8

A positive electrode plate for an alkaline storage battery was produced in the same manner as in Reference Example 3 except that the spraying of the compressed air was not performed.

[Evaluation]

The positive electrodes of Reference Examples produced above were subjected to the following evaluation. The results are shown in Table 6.

(Width Variation of Filled Portion)

The width of the filled portion was measured at 50 points uniformly spaced on the filled portion. A standard deviation a for width variation was determined. In the measurement, a part of the unfilled portion into which the material mixture paste spread was regarded as filled portion.

(Weld Defect Inspection)

One hundred cylindrical electrode groups, each electrode group produced by spirally winding the positive electrode plate and a well-known hydrogen storage alloy electrode with a separator made of sulfonated polypropylene non-woven fabric therebetween, were produced. A current collector plate was welded to the unfilled portion of the positive electrode plate at an end of the electrode group, after which a check was made to see if the part of the separator around the welded portion was discolored. The number of defective electrode groups having a discolored separator was counted.

TABLE 6

|  | Spraying of compressed gas | Number of filled portions | Thickener | Substrate | Width variation of filled portion σ (mm) | Number of electrode group with weld defect |
|---|---|---|---|---|---|---|
| Ref. Ex. 1 | Yes | 1 | CMC | Porous metal | 0.18 | 1 |
| Ref. Ex. 2 | Yes | 1 | CMC + xanthan gum | Porous metal | 0.13 | 0 |
| Ref. Ex. 3 | Yes | 1 | CMC | Punched metal | 0.25 | 2 |

TABLE 6-continued

|  | Spraying of compressed gas | Number of filled portions | Thickener | Substrate | Width variation of filled portion σ (mm) | Number of electrode group with weld defect |
|---|---|---|---|---|---|---|
| Ref. Ex. 4 | Yes | 2 | CMC | Porous metal | 0.19 | 1 |
| Ref. Ex. 5 | Yes | 2 | CMC + xanthan gum | Porous metal | 0.15 | 0 |
| Ref. Ex. 6 | Yes | 2 | CMC | Punched metal | 0.27 | 2 |
| Ref. Ex. 7 | No | 1 | CMC | Porous metal | 0.45 | 5 |
| Ref. Ex. 8 | No | 1 | CMC | Punched metal | 0.55 | 5 |

Table 6 illustrates that, compared to Reference Examples 7 and 8 in which compressed air was not sprayed to the unfilled portions, in Reference Examples 1 to 6, the width variation of the filled portion was reduced and the number of electrode groups having a weld defect was significantly decreased. Noteworthy among them are Reference Examples 2 and 5 in which CMC and xanthan gum were used as the thickener. In Reference Examples 2 and 5, no weld defect was observed because the spread of the material mixture paste was successfully prevented.

The present invention is broadly applicable to positive electrodes for alkaline storage batteries using a porous metal substrate having three-dimensionally connected pores. According to the present invention, it is possible to provide an alkaline storage battery capable of providing a large discharge capacity even when discharged at a large current and having superior high rate discharge characteristics, high active material utilization rate and excellent charge/discharge cycle characteristics at a lower cost than conventional techniques. Alkaline storage batteries to which the present invention is applicable include nickel-metal hydride storage batteries which are used as the power sources for portable devices, power tools, hybrid electric vehicles (HEV), etc., and nickel-cadmium storage batteries, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a positive electrode plate for an alkaline storage battery comprising the steps of:
controlling the thickness of an original material made of a porous metal having a weight per unit area of 150 to 350 g/m$^2$ to form a porous metal substrate;
filling a material mixture paste comprising an active material, an elastic polymer, xanthan gum and carboxymethyl cellulose into said substrate in a stripe pattern to form at least two filled portions and at least one unfilled portion;
drying said substrate filled with the material mixture paste;
rolling said dried substrate filled with the material mixture paste to form an electrode plate; and
cutting said electrode plate into a predetermined size, wherein said step of filling the material mixture past into the substrate comprises the steps of:
placing a plurality of die nozzles facing towards each other with a gap having a predetermined width therebetween,
allowing said substrate to pass through said gap in a longitudinal direction, and
spraying said material mixture paste onto said passing substrate from slit-shaped outlets of said plurality of die nozzles, said slit-shaped outlet being divided into a plurality of sections by at least one partition, or said die nozzle comprising a combination of a plurality of units, each unit having a slit-shaped outlet for spraying said material mixture paste, said plurality of units being arranged such that their slit-shaped outlets are aligned in a line.

2. The method for producing a positive electrode plate for an alkaline storage battery in accordance with claim 1, wherein
a compressed gas is sprayed onto a portion of said substrate corresponding to said unfilled portion while said material mixture paste is filled into said substrate.

3. The method for producing a positive electrode plate for an alkaline storage battery in accordance with claim 1, wherein, when said material mixture paste is filled into said substrate, the distance between said die nozzle and said substrate or the flow rate of said material mixture paste sprayed from said die nozzle is controlled based on the amount of said material mixture paste filled into said substrate measured by a X-ray weight analyzer or β-ray weight analyzer and/or based on the width of said filled portion on the substrate measured by an image recognition device.

4. The method for producing a positive electrode plate for an alkaline storage battery in accordance with claim 1, wherein
said plurality of die nozzles are arranged such that said plurality of die nozzles face towards each other with a displacement of the positions of their slit-shaped outlets in an amount of 1 to 5 mm in a passing direction of said substrate.

5. The method for producing a positive electrode plate for an alkaline storage battery in accordance with claim 1, wherein
said substrate has a thickness of 200 to 1500 .mu.m and a porosity of 88 to 97%.

6. The method for producing a positive electrode plate for an alkaline storage battery in accordance with claim 1, wherein the volume of said material mixture paste filled in said substrate is 95 to 150% of the volume of the pores of said substrate.

7. The method for producing a positive electrode plate for an alkaline storage battery in accordance with claim 1, wherein
said material mixture paste has a viscosity at 20 rpm of 3 to 15 Pas and a viscosity ratio: viscosity at 2 rpm/viscosity at 20 rpm of 2 or greater.

8. The method for producing a positive electrode plate for an alkaline storage battery in accordance with claim 7, wherein
said material mixture paste has a viscosity at 2 rpm of 10 to 70 Pas.

9. The method for producing a positive electrode plate for an alkaline storage battery in accordance with claim 1, wherein
said active material comprises nickel oxide particles, and said material mixture paste further comprises a conductive material and water.

10. The method for producing a positive electrode plate for an alkaline storage battery in accordance with claim 1, wherein
said elastic polymer has a glass transition temperature of −100 to +20° C., and
the amount of said elastic polymer contained in said material mixture is 0.2 to 5 parts by weight per 100 parts by weight of said active material.

* * * * *